Patented Feb. 25, 1936

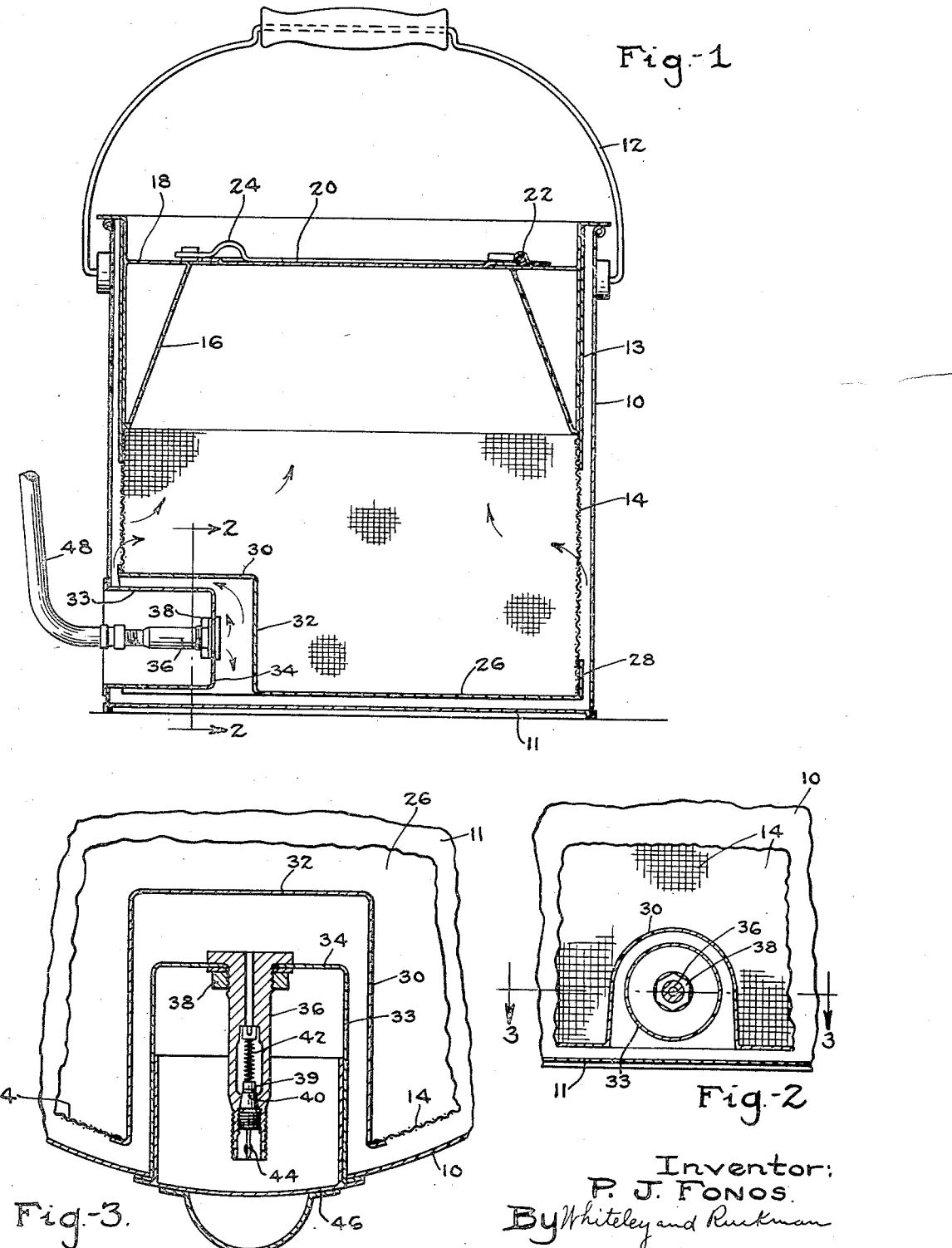

2,032,274

UNITED STATES PATENT OFFICE 2,032,274

LIVE BAIT BUCKET

Peter J. Fonos, Leavenworth, Kans.

Application July 26, 1935, Serial No. 33,227

2 Claims. (Cl. 43—56)

My invention relates to live bait buckets, and particularly to buckets for holding minnows and frogs. Considerable difficulty is ordinarily experienced in keeping such bait in the proper lively condition whereby they will attract fish. An object of my invention, therefore, is to provide an air conditioned bucket in which the bait may be maintained in proper condition for a considerable period of time. In carrying out my invention, I provide an imperforate outer container, an inner perforate container, a valve casing carried by the outer container having a passageway adapted to deliver air directly into water contained in the inner container, an inwardly opening valve in the passageway, and means whereby an air pump may be attached to the outer end of the valve casing. In this way, I am able to provide at comparatively small expense a device which is very efficient for the purpose above referred to.

The novel features which I believe to be characteristic of my invention are set forth with particularity in the appended claims. The invention itself, however both as to its organization and method of operation, together with additional objects and advantages thereof will be best understood from the following description of a specific embodiment when read in connection with the accompanying drawing in which, Fig. 1 is a view mostly in central vertical section showing my improvement applied to a live bait bucket.

Fig. 2 is a view in section on the line 2—2 of Fig. 1.

Fig. 3 is a view in section on the line 3—3 of Fig. 2.

Referring to the particular construction shown in the drawing, it will be seen that I provide an outside container 10 having a bottom 11 and which may be a pail made from sheet metal and provided with a bail 12 for carrying the same. Within the container 10 is an inside container having an upper cylindrical member 13 of sheet metal and a lower member 14 of screen material or other perforate material. The member 13 is provided with an interior flaring wall 16 to form a float. At its upper end, the member 13 is provided with a re-entrant top 18 having a perforated door 20 with hinge 22 and catch 24. The inside container has a bottom 26 which at its periphery is turned upwardly to provide a band 28 to which the lower end of the screen 14 is secured. At one side, the inside container is provided with a semi-cylindrical housing 30, the outer end of which is open and the inner end of which is closed by a wall 32 which joins with the bottom 26. The housing 30 serves to house a cylindrical member 33 having an inner end 34, the outer end of the cylinder being open and secured to the outside container 10 adjacent its bottom. The cylinder 33 receives an exteriorly screw-threaded valve casing 36, the inner end of which is held to the wall member 34 in any suitable manner as by a nut 38, it being understood as a matter of course that the valve casing 36 has an axial passageway extending through the wall member 34. The casing 36 contains a chamber in which is an inwardly opening valve 39 normally held upon a valve seat 40 by a spring 42. The valve 39 is provided with an outwardly extending stem 44 passing loosely through the seat 40. The cylinder 33 is provided with a closure 46 having a cylindrical portion adapted to be slid in telescopically. When the closure 46 is removed a tube 48 extending from an ordinary air pump may be attached to the outer end of the valve casing 36.

The operation and advantages of my invention will be apparent from the foregoing description and the accompanying drawing. In order to keep the live bait in the inside container in proper condition, the pump may be applied from time to time and air pumped directly into the water in the inside container. As indicated by the arrows in Fig. 1, ample space is provided between the members 30 and 33 for free passage of air to be absorbed by the water in the bucket.

Although I have shown and described a specific embodiment of my invention, I am fully aware that other embodiments thereof are possible. My invention, therefore, is not to be restricted except insofar as is necessitated by the prior art and by the spirit of the following claims.

I claim:

1. A live bait bucket comprising an outer imperforate container, an inner perforate container, an inwardly extending hollow member secured to said outer container, a valve casing secured within said hollow member having a passageway adapted to deliver air directly into water contained in said inner container, an inwardly opening valve in said passageway, and means whereby an air pump may be attached to the outer end of said valve casing.

2. A live bait bucket comprising an outer imperforate container, an inner perforate container, an inwardly extending housing secured to said inner container, an inwardly extending hollow member secured to said outer casing and spaced inside of said housing, a valve casing secured within said hollow member having a passageway adapted to deliver air directly into water contained in said inner container, an inwardly opening valve in said passageway, and means whereby an air pump may be attached to the outer end of said valve casing.

PETER J. FONOS.